United States Patent [19]

Mengel

[11] Patent Number: 4,943,698

[45] Date of Patent: Jul. 24, 1990

[54] HARDFACING POWDERS

[75] Inventor: Keith E. Mengel, Marshall, Mich.

[73] Assignee: Eaton Corporation, Cleveland, Ohio

[21] Appl. No.: 815,335

[22] Filed: Dec. 31, 1985

[51] Int. Cl.$^5$ .................................................. B23K 9/00
[52] U.S. Cl. ........................... 219/121.47; 219/121.59; 219/76.16; 219/76.15; 427/34; 75/255
[58] Field of Search .................. 219/121 PL, 121.84, 219/76.16, 121 PQ, 121 PS, 75, 74, 121 M, 76.15; 427/34; 106/14.5, 1.2; 204/37.1; 75/255

[56] References Cited

U.S. PATENT DOCUMENTS

| | | | |
|---|---|---|---|
| 4,508,788 | 4/1985 | Cheney | 427/34 |
| 4,536,259 | 8/1985 | Oda et al. | 427/34 |
| 4,562,090 | 12/1985 | Dickson et al. | 427/34 |
| 4,578,115 | 3/1986 | Harrington et al. | 427/34 |

*Primary Examiner*—M. H. Paschall
*Attorney, Agent, or Firm*—A. E. Chrow

[57] ABSTRACT

The occurrence of porosity in hardfacing deposits produced by plasma transferred arc welding is significantly reduced by blending a porosity reducing agent preferably aluminum and/or manganese, with the hardfacing powder.

7 Claims, No Drawings

HARDFACING POWDERS

TECHNICAL FIELD

The present invention relates generally to hardfacing materials, and more specifically to improvements in hardfacing powders used in plasma transferred arc welding operations.

DESCRIPTION OF THE PRIOR ART

A plasma transferred arc welding process for applying a wear resistant coating to workpieces, such as the seating surfaces of engine valves and the like, is described in U.S. Pat. No. 4,104,505, the disclosure of which is incorporated by reference. The hardfacing powders used in such a process are typically nickel base, cobalt base, and iron base compositions.

A problem encountered in plasma arc hardfacing is weld porosity which is attributed to the liberation of oxygen and nitrogen from the hardfacing powder and base metal during the welding process.

The high temperature of the plasma arc column reduces the molecular oxygen and nitrogen compounds, present in the hardfacing powder and base metal to their atomic states. Upon deposition and solidification of the weld, the oxygen and nitrogen reform into molecular compounds, some of which are pockets of oxygen and nitrogen gas. Upon cooling of the molten weldment the surplus oxygen and nitrogen are no longer soluble and form bubbles of molecular gas. The amount of porosity is enhanced by the rapid cooling rate of the molten weld pool since there is insufficient time for the gases to come out of the weldment.

Attempts have been made to reduce weld porosity by alloying scavenging elements such as aluminum and titanium with the weld powder metal before it is reduced to powder form. Much of the effectiveness of the prealloyed scavengers is negated by the powder manufacturing process in which the powder charge including, in some instances, a fluxing agent, is melted in an induction furnace shielded with argon, and is then atomized, usually in nitrogen. With this present practice, which is representative of general commercial practice for manufacture of plasma hardfacing powders, the most effective scavengers such as aluminum and titanium, cannot be effectively prealloyed without coslty manufacturing practices such as vacuum melting and atomization.

Other attempts have been made to reduce weld porosity by decreasing the allowable total gas content of the powder. These attempts have been largely unsuccessful because it is very difficult for the manufacturers economically and consistantly to keep the gas contents below a threshold content of about 800 ppm, above which threshold porosity may be encountered.

An attempt has been made to reduce weld porosity by using a mixture of argon and hydrogen gas as the weld shielding gas. While a slight decrease in porosity was obtained, the reduction did not offset the additional cost of the shielding gas.

SUMMARY OF THE INVENTION

It has been discovered that the porosity of hardfacing deposits, especially those formed by nickel based, cobalt based, and iron based plasma hardfacing welds, attributed to the liberation of oxygen and nitrogen or other gases from the powder and base metal can be materially reduced by blending a powdered, porosity reducing agent with the hardfacing powder. The term "porosity reducing agent" is intended to mean a "getter" which is an element or compound that combines with oxygen or nitrogen or other gaseous elements or compounds to form solid compounds, and a "solubility improver" which is an element or compound that increases the amount of gases that can be dissolved in the molten weld metal before forming porosity. When using a powder containing a getter, the reduction in porosity is achieved as a result of chemical reactions that take place when the powder is passed through and melted by the plasma column. The high temperatures of the column cause the getter to be reduced to atomic form so that it readily combines with the atomic oxygen and nitrogen released from the weld powder and base metal as a result of welding to form oxides and nitrides.

According to the preferred embodiments, the invention is a mixture consisting essentially of a hardfacing powder, such as one selected from the group generally consisting of nickel based, cobalt based, and iron based materials, mechanically blended with a porosity reducing agent. The porosity reducing agent may be either a getter or solubility improver. The getter is characterized by a higher thermodynamic affinity for gases in the molten weld pool, particularly oxygen and nitrogen, than the principal elements of the hardfacing powder. The solubility improver is characterized by improving the solubility of the molten weld metal so that it may dissolve a greater content of gases, particularly oxygen and nitrogen, before forming porosity. Both the getter and solubility improver are preferably selected from the group consisting of aluminum, titanium, silicon, manganese, niobium, zirconium, lithium, vanadium, hafnium, yttrium, sodium, calcium, rare earths, and master alloys thereof. A master alloy is defined as an alloy rich in one or more of the foregoing group members.

The total amount of porosity reducing agent present in the mixture preferably ranges from about 0.05% to 12.00% by weight, based on the weight of the hardfacing powder, although some variations of this range are permissible, and in fact desirable depending upon the composition of the hardfacing powder, the particular porosity reducing agent, and the residual content, if any, of the porosity reducing agent present in the powder.

Aluminum and manganese are especially preferred porosity reducing agents. Aluminum is used primarily as a getter addition to nickel base welding powders and manganese is used primarily as a solubility improvers addition to cobalt and iron based powders. The preferred minimium addition of alumnium is about 0.05% by weight of the welding powder and the preferred minimum addition of manganese is about 0.50% by weight of the welding powder. Additions less than these amounts are usually ineffective to reduce weld porosity. Additions of aluminum greater than about 0.50%, and in some instances more than about 0.20%, in nickel base powders risk the formation of a gamma prime phase which may significantly change the weldment metallurgy. If these changes are of no consquence to the application, the higher aluminum content can be used, however care must to taken to assure this to be fact.

While the preferred maximum addition of manganese in cobalt and iron base powders is about 0.50% to 1.50%, this element may be added in amounts of up to 12.00% without creating any phases considered undesirable for intended application of these welds.

In accordance with the foregoing, a specific embodiment of the invention consists essentially of a nickel based hard facing powder and powdered aluminum, the total amount of the powdered aluminum ranging form about 0.05% to about 0.50%, and more preferably from about 0.05% to about 0.20% by weight of the powder. Another specific embodiment of the invention consists essencially of a cobalt base hardfacing powder mixed with powdered manganese, the amount of powdered manganese ranging from about 0.50% to about 12.00%, and more preferably from about 0.50% to about 1.50%, by weight based on the weight of the powder.

Still other features, the specific embodiments and a fuller understanding of the invention will be had from the following detailed description.

DESCRIPTION OF THE PREFERRED EMBODIMENTS

The improvement provided by the invention consists generally of one or more powdered, porosity reducing agents which function as a getter and/or a solubility improver and are mechanically blended with hardfacing powders used with plasma arc hardfacing porcesses. The compositions of the hardfacing powders do not form a part of the invention, but are typically nickel based, cobalt based, and iron based powders.

An exemplary nickel based hardfacing is sold commercially by the Eaton Corporation in the form of seat welds deposited on engine valves, under the designation of EMS 243. Prior to welding EMS 243 is in the form of gas atomized metal powder having a specified particle mesh size range of from −80 to +325 mesh ASTM E-11 (100 to 45 microns) and consists esencially in percent by weight of from 28.00–30.00 chromimum, 7.00–9.00 molybdenum, 1.80–2.20 carbon, 1.00–8.00 iron, 0.80–1.20 silicon, 0.00–0.50 manganese, and the balance nickel except for residuals totalling less than about 1.00 including up to about 0.04 oxygen, up to about 0.08 nitrogen and up to about 0.05 aluminum.

An exemplary cobalt based hardfacing is sold commercially by the Eaton Corporation in the form of seat welds deposited on engine valves, under the designation of EMS 242. Prior to welding EMS 242 is in the form of gas atomized metal powder having a specified particle mesh size range of from −80 to +325 mesh ASTM E-11 (100 to 45 microns) and consists esencially in percent by weight of from 26.00–30.00 chromimum, 0.00–5.00 nickel, 3.50–5.50 tungsten, 0.90–1.40 carbon, 0.00–6.00 iron, 0.80–1.30 silicon, 0.05–1.5 manganese, and the balance cobalt except for residuals totalling less than about 0.50 including up to about 0.03 oxygen, up to about 0.08 nitrogen and up to about 0.02 aluminum.

An exemplary iron based hardfacing is sold commercially by the Eaton Corporation in the form of seat welds deposited on engine valves, under the designation of EMS 253. Prior to welding EMS 253 is in the form of gas atomized metal powder having a specified particle mesh size range of from −80 to +325 mesh ASTM E-11 (100 to 45 microns) and consists esencially in percent by weight of from 26.00–30.00 chromimum, 14.00–16.00 nickel, 4.00–7.00 molybdenum, 1.50–2.20 carbon, 0.00–1.50 silicon, 0.00–1.00 manganese, and the balance iron except for residuals totalling less than about 0.20 including up to about 0.04 oxygen, up to about 0.08 nitrogen and up to about 0.01 aluminum.

Aluminum is the preferred getter and manganese is is the preferred solubility improver. Manganese has been found to be the most effective in cobalt based powders by increasing the solubility of the powder such that it may accept a greater amount of nitrogen into solid solution. Aluminum has found to be more effective in nickel based powders by combining with oxygen and nitrogen to form solid oxides and nitrides. Aluminum and manganese also appear to be the most cost effective, are easily attainable in the required form, and are safe for mechanical blending. Other getters comtemplated for use include titanium, silicon, niobium, zirconium, vanadium, hafnium, yttrium, rare earths and master alloys containing these elements.

As indicated above, the typical welding powders include one or more of the getters and solubility improvers, e.g. aluminum and manganese, as residuals in amounts of less than 1%. The prealloyed content of the hardfacing powder can determined in order to calculate the weight percent addition of porosity reducing agent needed to reach the desired content in the mixture. With aluminum, a mixture content less than about 0.05% has been found to be ineffective in most instances to reduce weld porosity, and a more preferred minimum is 0.10%. Additions of aluminum to nickel based powders in amounts greater than about 0.50%, and in some cases more than about 0.20%, introduce the risk of forming a crack sensitive gamma prime phase. In the case of manganese, it has been found that effective porosity reduction begins with a minimum content of about 0.50%. Manganese contents up to about 12.00% are not believed to cause undesirable effects for the application of valve seats, although additions of above 1.50% to cobalt based powders generally do not yield additional significant weld porosity reductions.

In one example of the invention, the heads of engine valves were hardfaced with a mixture of nickel based powder and getter using the standard welding procedures as disclosed, for example, in U.S. Pat. No. 4,104,505. The composition of the base metal of the valves consisted essencially in percent by weight of from 11.00–12.00 chromimum, 0.90–1.25 molybdenum, 0.90–1.25 tungsten, 0.50–1.00 nickel, 0.50–1.00 manganese, 0.20–0.50 vanadium, 0.00–0.50 silicon, 0.20–0.25 carbon, and the balance iron except for residuals including 0.0350–0.0550 nitrogen. The composition of the nickel based powder EMS 243 was in the ranges stated above. The hardfacing powder was mixed with 0.10% by weigh powdered aluminum having a mesh size range compatable with the welding equipment and preferably in the mesh size range of −80 +325 ASTM E-11 (100 to 45 microns).

In this example of the invention, the rejection rate attributed to seat porosity in two production runs was 0.10 and 2.00%. In two production runs where the valves were hardfaced with the same powder but without an aluminum addition, the rejection rate was 9.20% and 10.00%.

In a second example of the invention, the heads of engine valves were hardfaced with a mixture of cobalt based hard facing powder and manganese using standard plasma transferred arc procedures as described, for example, in U.S. Pat. No. 4,104,505. The composition of the valve metal consisted essencially in percent by weight of from 22.00–24.00 chromimum, 7.00–9.00 nickel, 0.00–0.50 molybdenum, 0.00–0.50 tungsten, 0.28–0.38 carbon, 0.60–0.90 silicon, 1.50–3.50 manganese, and the balance iron except for residuals including 0.28–0.35 nitrogen. The cobalt based hardfacing powder, EMS 242, had the composition given above and was mixed with a 1.00% by weight addition of manganese powder having in a mesh size range compatable with the welding equipment and preferably in the mesh size range of −80 +325 ASTM E-11 (100 to 45 microns).

In two production runs, the rejection rate due to seat porosity averaged 4.00% and 6.00%. When the same part number valves were hardfaced with the same powder but without the additon of manganese, the rejection rate in each of two production runs averaged 10%.

It will be seen that the invention has achieved the objective of significantly reducing the porosity of hardface welds produced by plasma transferred arc processes, and that this has done so in a simple and economic manner. It will also be seen that no modification of standard plasma arc welding procedures is required as a result of the addition of porosity reducing agents to the hardfacing powder.

Many modifications and variations of the invention will be apparent to those skilled in the art in light of the foregoing disclosure. Therefore it is to be understood that, within the scope of the appended claims, the invention can be practiced otherwise then has specifically described.

I claim:

1. A plasma arc hardfacing powder consisting essentially of a hardfacing powder and a powdered, porosity reducing agent that is at least one member selected from the group consisting of aluminum, manganese, titanium, silicon, zirconium, vanadium, lithium, hafnium, yttrium, sodium, calcium, rare earths, and master alloys thereof.

2. A mixture as claimed in claim 1 wherein said porosity reducing agent is present in an amount ranging from about 0.05% to about 12.00% by weight based on the weight of said hardfacing powder.

3. A mixture as claimed is claim 2 wherein said porosity reducing agent is present in an amount ranging from about 0.05% to about 12.00% by weight based on the weight of said hardfacing powder.

4. A mixture as claimed in claim 1 wherein said porosity reducing agent comprises aluminum present in an amount ranging from about 0.05% to about 0.50% by weight based on the weight of said hardfacing powder.

5. A mixture as claimed in claim 1 wherein said porosity reducing agent comprises manganese in an amount ranging from about 0.50% to about 12.00% by weight based on the weight of said hardfacing powder.

6. A mixture consisting essentially of a nickel based hard facing powder and powdered aluminum in an amount ranging from about 0.05% to about 0.50% by weight based on the weight of said hardfacing powder.

7. A mixture consisting essentially of a cobalt based hard facing powder and powdered manganese in an amount ranging from about 0.50% to about 12.00% by weight based on the weight of said hardfacing powder.

* * * * *